United States Patent
Yankovich et al.

(10) Patent No.: US 7,103,835 B1
(45) Date of Patent: Sep. 5, 2006

(54) PROCESS BUILDER FOR A ROUTABLE ELECTRONIC DOCUMENT SYSTEM AND METHOD FOR USING THE SAME

(75) Inventors: Steve Yankovich, San Jose, CA (US); Nathan Hoover, Los Gatos, CA (US); Benjamin True, Scotts Valley, CA (US); Bronson Silva, Campbell, CA (US); Brandon Lowell Duncan, San Jose, CA (US)

(73) Assignee: Movaris, Inc., San Jose, CA (US)

( * ) Notice: Subject to any disclaimer, the term of this patent is extended or adjusted under 35 U.S.C. 154(b) by 420 days.

(21) Appl. No.: 10/097,513

(22) Filed: Mar. 12, 2002

(51) Int. Cl.
*G06F 15/00* (2006.01)

(52) U.S. Cl. .................. 715/505; 715/526; 715/538

(58) Field of Classification Search ............... 715/505, 715/506, 526, 538, 901, 511, 513, 507; 706/45, 706/47; 705/28, 29
See application file for complete search history.

(56) References Cited

U.S. PATENT DOCUMENTS

| | | | | |
|---|---|---|---|---|
| 5,222,211 | A | * | 6/1993 | Mueller et al. ............ 715/506 |
| 5,235,654 | A | * | 8/1993 | Anderson et al. .......... 382/180 |
| 5,299,305 | A | * | 3/1994 | Oomae et al. ............. 715/506 |
| 5,317,686 | A | * | 5/1994 | Salas et al. ............... 715/503 |
| 5,367,619 | A | * | 11/1994 | Dipaolo et al. ............ 715/506 |
| 5,428,694 | A | * | 6/1995 | Betts et al. ............... 382/317 |
| 5,634,064 | A | | 5/1997 | Warnock |
| 5,703,788 | A | * | 12/1997 | Shei et al. ................ 716/4 |
| 5,704,045 | A | | 12/1997 | King et al. |
| 5,790,790 | A | * | 8/1998 | Smith et al. .............. 709/206 |
| 5,797,133 | A | | 8/1998 | Jones et al. |
| 5,848,271 | A | * | 12/1998 | Caruso et al. ............ 712/220 |
| 5,862,223 | A | | 1/1999 | Walker et al. |
| 5,953,523 | A | | 9/1999 | Martinez et al. |
| 5,953,528 | A | | 9/1999 | Sullivan |

(Continued)

FOREIGN PATENT DOCUMENTS

JP 07253864 A * 10/1995

OTHER PUBLICATIONS

Chester, Thomas, et al, Mastering Excel 97, Fourth Edition, Sybex Inc., 1997, pp. 107, 273-281, 303-304, 447-450, 455-457, 460, 607-608, and 744-747.*

(Continued)

*Primary Examiner*—William Bashore
*Assistant Examiner*—Laurie A. Ries
(74) *Attorney, Agent, or Firm*—Patentry; Peter G. H. Hwang

(57) ABSTRACT

A process builder for a system of routing electronic documents and a method for using the same are provided. The process builder receives an electronic document having programmable features. The process builder determines a number of attributes and form fields from the electronic document. Data input is received by the process builder from an electronic document author via a graphical user interface. The process builder defines logical conditions for one or more of the form fields and attributes based on the received data input, and combines the logical conditions into logical expressions. The process builder then translates the logical expressions into program code and inserts the generated program code into the electronic document.

3 Claims, 20 Drawing Sheets

U.S. PATENT DOCUMENTS

| | | | |
|---|---|---|---|
| 6,070,177 | A | 5/2000 | Kao et al. |
| 6,084,585 | A | 7/2000 | Kraft et al. |
| 6,137,488 | A | 10/2000 | Kraft et al. |
| 6,185,583 | B1* | 2/2001 | Blando ................. 715/507 |
| 6,192,381 | B1 | 2/2001 | Stiegemeier et al. |
| 6,219,668 | B1* | 4/2001 | Arnaud et al. ............. 707/10 |
| 6,253,323 | B1 | 6/2001 | Cox et al. |
| 6,256,614 | B1 | 7/2001 | Wecker et al. |
| 6,272,506 | B1 | 8/2001 | Bell |
| 6,279,042 | B1 | 8/2001 | Ouchi |
| 6,295,536 | B1 | 9/2001 | Sanne |
| 6,314,415 | B1 | 11/2001 | Mukherjee |
| 6,360,254 | B1 | 3/2002 | Linden et al. |
| 6,490,601 | B1* | 12/2002 | Markus et al. ........... 715/507 |
| 6,542,912 | B1* | 4/2003 | Meltzer et al. ......... 715/501.1 |
| 6,584,480 | B1* | 6/2003 | Ferrel et al. ............. 715/513 |
| 6,684,188 | B1* | 1/2004 | Mitchell et al. ............. 705/3 |
| 6,748,425 | B1* | 6/2004 | Duffy et al. ............. 709/217 |
| 2002/0049767 | A1* | 4/2002 | Bennett ................ 707/104.1 |
| 2002/0073145 | A1* | 6/2002 | Shimoji ................. 709/203 |
| 2002/0078104 | A1* | 6/2002 | Kagimasa et al. ........ 707/530 |
| 2002/0103827 | A1* | 8/2002 | Sesek ................... 707/505 |
| 2002/0129238 | A1* | 9/2002 | Toh et al. ............... 713/153 |
| 2002/0147743 | A1* | 10/2002 | Le et al. ................ 707/505 |
| 2002/0161733 | A1* | 10/2002 | Grainger ................. 706/45 |
| 2002/0198903 | A1* | 12/2002 | Robison et al. .......... 707/500 |
| 2003/0023641 | A1* | 1/2003 | Gorman et al. .......... 707/530 |
| 2003/0046639 | A1* | 3/2003 | Fai et al. ................ 715/513 |

OTHER PUBLICATIONS

Stubblefield, William A., et al, "The Social Life of Engineering Authorizations", Proceedings of the Conference on Designing Interactive Systems: Processes, Practices, Methods, and Techniques, Aug. 2000, pp. 9-19.*

Prinz, Wolfgang, et al, "Support for Workflows in a Ministerial Environment", Proceedings of the 1996 Conference on Computer Supported Cooperative Work, Nov. 1996, pp. 199-208.*

Grather, Wolfgang, et al, "Enhancing Workflows by Web Technology", Proceedings of the International ACM SIGGROUP Conference on Supporting Group Work: The Integration Challenge, Nov. 1997, pp. 271-280.*

Sneed, H.M., et al "Extracting Business Rules from Source Code", Proceedings of the Fourth Workshop on Program Comprehension, Mar. 1996, pp. 240-247.*

Pope, S., et al., "Using the web for peer review and publication of scientific journals", Learning by doing: the Conservation Ecology Project, Sep. 1998, pp. 1-10.

Mathews, G., et al., "Electronic Management of the Peer Review Process", Fifth International World Wide Web Conference, May 6-10, 1996, Paris, France, pp. 1-22.

* cited by examiner

| Logical operator as shown by the process builder | Corresponding JavaScript code | Corresponding "C" code | Corresponding Pascal code |
|---|---|---|---|
| numeric equal to | == | == | = |
| numeric not equal to | != | != | <> |
| numeric greater than | > | > | > |
| character equal to | == | strcmp(...) | = |

Dept: __Engineering__   Expense Type: __Capital__   Budgeted?   Yes   No

Amount: __$6400.00__

Submitter:_____ Date:_____
Manger:_____ Date:_____
Director:_____ Date:_____
Vice President:_____ Date:_____
CFO:_____ Date:_____
Accounts Payable:_____ Date:_____

---

Condition 1: If Dept=Marketing, and if Submitter=Marketing Group 1 Then Manager = Marketing Group Manager 1.
Condition 2: If Dept=Product Marketing, and if Submitter=Marketing Group 2 Then Manager = Marketing Group Manager 2.

Check Submitter, If (Condition 1 OR Condition 2) & Expense Type=Capital and Budgeted=No & Amount>5000 Then Director is required and=Marketing Director.

*Example of data centric routing rule definition*

PROCESS BUILDER FOR A ROUTABLE ELECTRONIC DOCUMENT SYSTEM AND METHOD FOR USING THE SAME

FIELD OF THE INVENTION

The invention relates generally to routable documents, and more particularly, to a process builder for creating routable documents.

BACKGROUND

Traditional business processes rely on forms (paper documents), which are typically filled out by an individual and reviewed by one or more persons to control and document the flow of work within the business. Because of the cumbersome, costly, and error-prone nature of paper forms, businesses seek to automate the processes controlled by forms by making the forms into interactive electronic applications, which will decrease the time needed to complete the process and assure accurate and complete compliance with the business and legal requirements associated with the process.

In most systems that automate form based business processes the approach for describing business rules, namely the serial routing based on input field data, is data centric and is role based. The data centric approach is one where each data field on the form that may effect routing rules has a decision diagram built for it. How each data field effects the routing must be defined by the user either by using a graphical user interface to create a state diagram, or by writing custom programming code. As this routing rule is built the specific user or user role is considered. That is, if the submitter is Mary Johnson, then the next user is Joe Anderson. In the role based approach, if the submitter is in Marketing Group 1, then the next user is Market Group 1 Manager.

What is needed is a system to create electronic forms that can emulate the flow in a traditional paper form based process where each user is guided by a list of anonymous titles, or roles, listed on the form with lines or boxes where an indication of each user's approval in the electronic process will be stored, just as the hand written signature signifies approval on the paper counterpart.

SUMMARY OF THE INVENTION

A process builder for a system of routing electronic documents and a method for using the same are provided. The process builder receives an electronic document having programmable features. The process builder determines a number of attributes and form fields from the electronic document. Data input is received by the process builder from an electronic document author via a graphical user interface. The electronic document author defines logical conditions for one or more form fields attributes based on the received data input, and combines the logical conditions into logical expressions. The process builder then translates the logical expressions into program code and inserts the generated program code into the electronic document.

BRIEF DESCRIPTION OF THE DRAWINGS

The present invention is illustrated by way of example, and not limitation, in the figures of the accompanying drawings, in which:

FIG. 4 illustrates a table showing a sample mapping of logical phrases;

FIG. 5a illustrates one embodiment of a graphical user interface (GUI) window with a process creation checklist main menu screen;

FIG. 5f illustrates one embodiment of a GUI window with a rules editor screen for an "operations" signature field in FIG. 5e;

FIG. 5l illustrates one embodiment of a GUI window with a build screen;

FIG. 6 illustrates one embodiment of an electronic document embodying the rule created from rules editor screen of FIG. 5f;

FIG. 7 illustrates one embodiment of an electronic document with inserted programming code;

DETAILED DESCRIPTION

Figure 1:
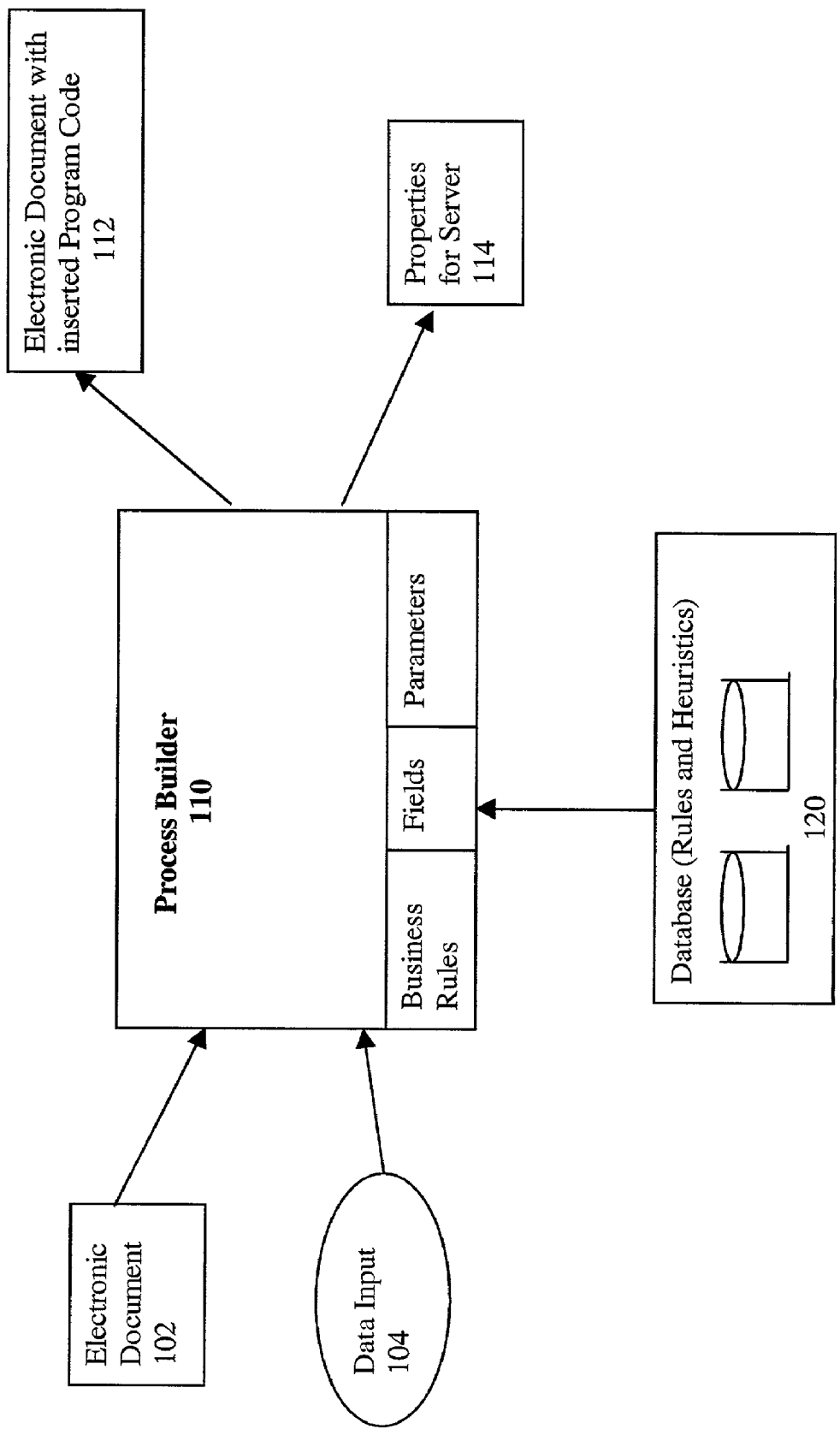
FIG. 1 illustrates a block diagram of one embodiment of a process builder.

A process builder for a system of routable electronic documents and method for using the same are disclosed. The process builder may be used by someone unfamiliar with programming language, such as a business analyst, to design and build an application, and/or components of an application, which automates a business process. A graphical user interface captures information from the electronic document author, and then produces a custom computer program which automates a business process. Accordingly, the electronic document author is able to write a computer program for this purpose without any programming knowledge.

The graphical user interface on the process builder allows the electronic document author to define business rules and process parameters for data validation and electronic document routing. The electronic document author inputs data via the graphical user interface, which is subsequently compiled into a process descriptor language. The compilation of business rules, process parameters and data validation is the result of heuristics based on the supplied information about the business process as well as inserted calls to pre-defined programming routines for common functions.

In one embodiment, the process builder may create a system of routable electronic documents that enable a business to deploy a wide variety of electronic documents, track and control the flow of the electronic documents, and assure the quality of the data captured in the electronic documents. The results are increased productivity, reduced cycle time, and enhanced compliance of the process with the business requirements. This will provide a business with the ability to streamline, coordinate and increase the overall quality of the processes driven by electronic documents. The process builder may be applied to business processes as simple as a single electronic document or as complex as a process requiring a number of electronic documents, integrating and coordinating a number of participants in a mission-critical system.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

In describing the invention, the following terms with their indicated definitions are used:

DEFINITIONS

Electronic Document

The representation of a document containing fields for the capture of information in an electronic medium that supports embedded program code which can control visual and non-visual elements of the medium.

Form Field

An element in the electronic document that allows data entry or allows the specification of an action such as a text field, button, check box, pull-down list, etc.

Electronic Document Author

A business analyst or specialist having specific knowledge about a particular business process who prepares the corresponding electronic document or electronic documents needed to implement the process in electronic media representation using the process builder.

Electronic Document User

Any of the various individuals who are required to fill-out, review, approve, or otherwise interact with the electronics documents that are a par of a business process.

Condition

An expression (equation) consisting of Boolean, comparisons or mathematical operators acting upon one or more form fields.

Rule (Logical Expression)

A condition or collection of conditions that if true make the routing (approval) of a specific electronic document user role required, or change the appearance or other attributes of one or more elements of the electronic document.

Logical Connector

In one embodiment, Boolean operator (AND, OR) where the AND operator requires the connected conditions to both be true for the connected pair (or all connected conditions) to be true and the OR operator where any connected condition being true results in a true result.

Library Function

A stored function (condition, rule, program code) that can be used in one or more locations within the system.

Platform Overview

FIG. 1 illustrates a block diagram of one embodiment of a process builder 110. The process builder 110 enables a electronic document author such as a business analyst to create and deploy one or more electronic documents (in electronic media), which implement a specific business process. The process builder 110 allows the electronic document author to specify logical conditions (based on the contents of fields in the electronic document and on calculated values) and combinations of conditions in groups connected with simple logical operators using a graphical, user interface.

These conditions and groups of conditions may serve one or more functions. One function may be to determine the validity of the data entered in a field by the electronic document user. A second function may be to determine the routing of the electronic document. A third function may be to determine the appearance of the electronic document (modifying visibility, color, etc. of electronic document elements). A fourth function may be to determine the amount of information required to be supplied by the electronic document user. A fifth function may be to determine additional electronic documents or processes, if any are required for the particular instance of the electronic document. In alternative embodiments, there may be other functions specific to a business process.

The process builder prepares the necessary programming code to implement the rules and assure that the rules and contained conditions are executed in the order appropriate to the availability of the data required to evaluate the rules. The code for the rules, together with associated supporting programming functions (library functions) is inserted into the electronic media for the electronic document automatically by the process builder.

Referring to FIG. 1, the process builder 110 receives an electronic document 102. In one embodiment, the electronic document may be created by scanning a paper copy of the document. In an alternative embodiment, the document may already exist electronically.

The electronic document author also enters data input 104 via a graphical user interface. The data input may include information about certain form fields in the electronic document such as signature fields. The data input may be used to define and control the visibility, edit-ability, required input, validation, and routing approval signature flow for the electronic document 102. The process builder 110 also obtains a number of rules and heuristics from a database 120.

Figure 2:
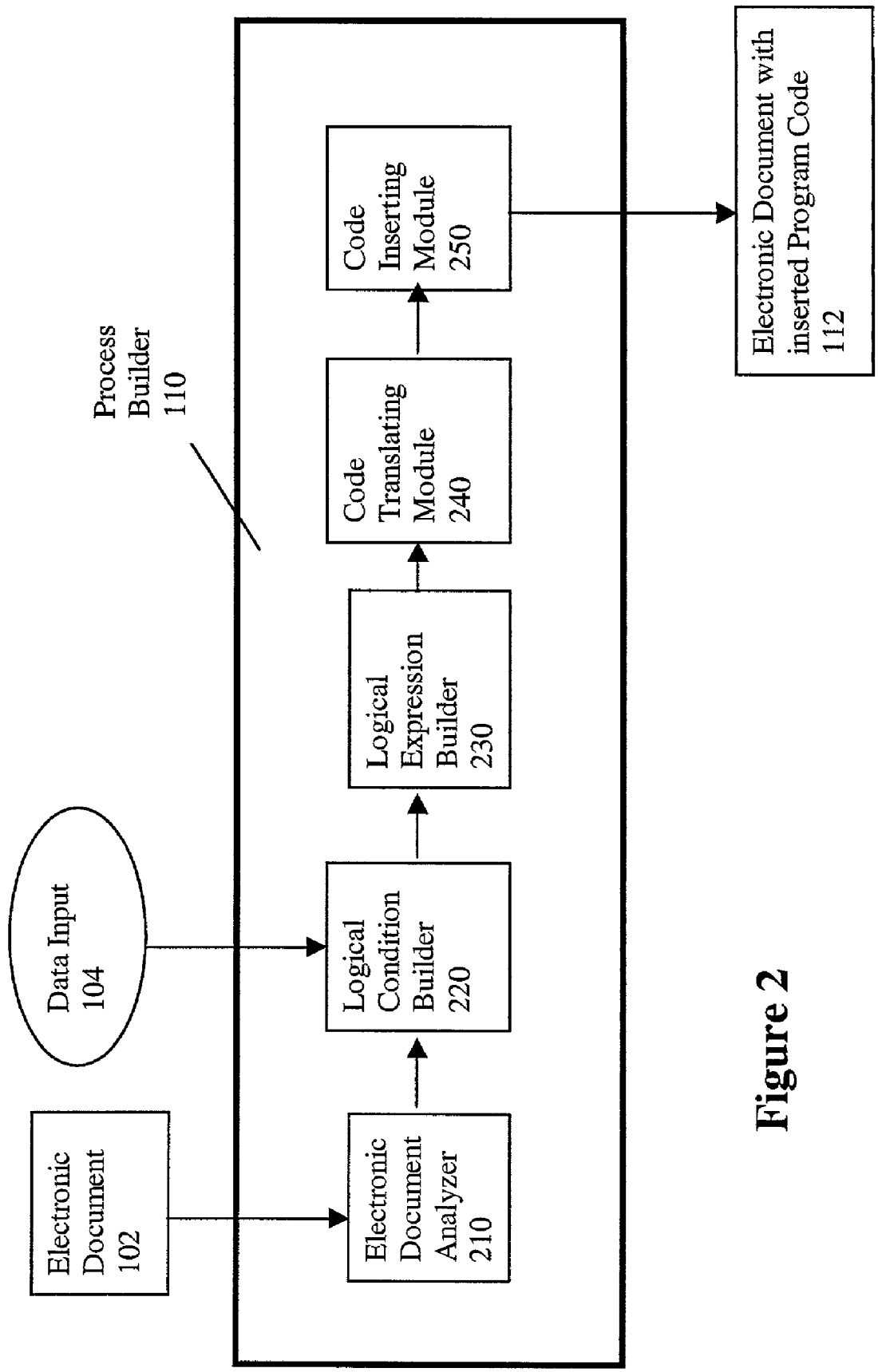
FIG. 2 illustrates a block diagram of the embodiment of the process builder shown in FIG. 1.

From this information, the process builder 110 outputs an electronic document with inserted program code 112 and properties 114 of that electronic document 112 to the server. FIG. 2 discusses this process in greater detail.

FIG. 2 illustrates a block diagram of the embodiment of the process builder 110 shown in FIG. 1. The process builder 110 receives the electronic document 102. An electronic document analyzer 210 in the process builder 110 determines a number of attributes and form fields from the electronic document 102.

In one embodiment, the electronic document analyzer 210 gathers attributes from the electronic document 102. For example, the electronic document analyzer 210 may gather the electronic document's title and the electronic document's owner. In alternative embodiments, this information may come from the electronic document author.

The electronic document analyzer 210 passes this information to a logical condition builder 220. The logical condition builder 220 also receives data input 104 from the electronic document author via a graphical user interface.

In one embodiment, the data input 104 may include information such as the electronic document's title, who is responsible for the electronic document, the electronic document's technical contact, the electronic document's administrators and inspectors. The data input 104 may also include information such as labels for various form fields.

The logical condition builder 220 takes this information and defines logical conditions for one or more of the form fields and attributes. The logical condition builder 220 outputs this information to a logical expression builder 230, which groups the logical conditions built by the logical condition builder 220 to form one or more rules. Further detail about building logical conditions and grouping logical conditions together to form a rule or logical expression is provided with reference to FIG. 3. A specific example is discussed with reference to FIG. 6.

A code translating module 240 receives this information from the logical expression builder 230 and translates the logical expressions into program code. The code translating module 240 outputs the program code to a code inserting module 250, which inserts the program code into the electronic document 102. The code inserting module 250 then outputs the electronic document with inserted program code 112.

In one embodiment, the electronic document 102 is in portable document format (PDF), and the programming code is JavaScript. In an alternative embodiments, the electronic document 102 is in a web browser compliant markup language such as HTML, XML/XSLT, XForms, XHTML, WML, etc. The programming code is JavaScript, Java, or other language that can be executed in a web browser. In another alternative embodiment, the electronic document 102 is in Microsoft Word, and the programming code is visual basic for applications (VBA).

Figure 3:
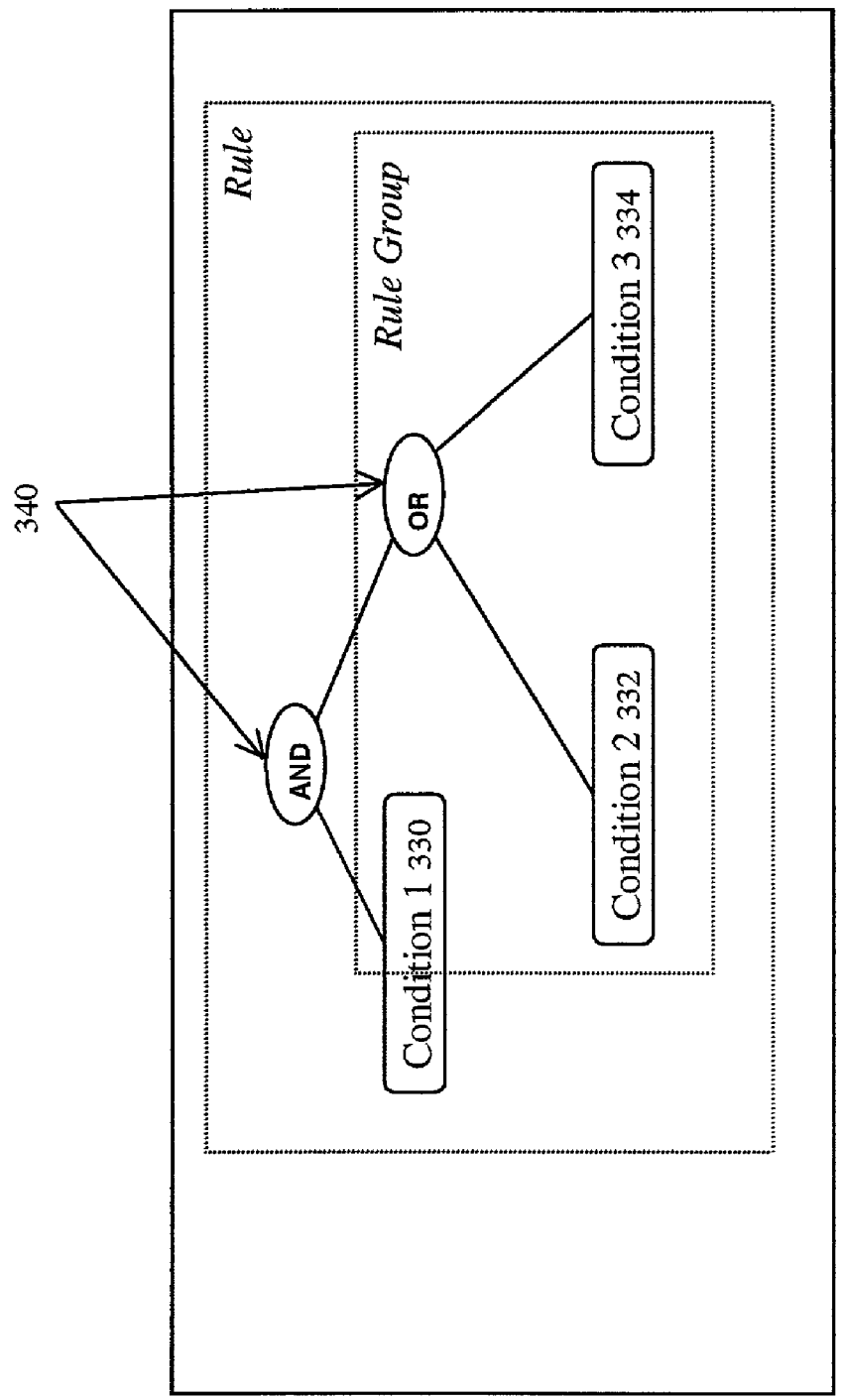
FIG. 3 illustrates a block diagram of one embodiment of a group of conditions connected by logical operators.

FIG. 3 illustrates a block diagram of one embodiment of a group of conditions connected by logical operators 340. As seen in FIG. 3, three conditions have been defined: condition 1 330, condition 2 332, and condition 3 334.

Logical operators 340 connect each of these conditions 330, 332, and 334 to form a rule 310. A logical operator can express the (Boolean) relationship between: (1) two conditions, (2) a condition and a rule group, or (3) two rule groups. In one embodiment, logical connectors are "AND" (logical conjunction) or "OR" (logical product) relationships.

A rule or logical expression is either a logical condition or a combination of logical conditions, structured in a formal way. For example, a rule group is either a single logical condition or a sequence of rule groups joined by logical operators. A rule is a rule group. The structure of a rule is such that the result of evaluating the rule and its contents is a Boolean value. The rule is said to be true or false according to the results of the evaluation.

Logical conditions are the building blocks of a rule. In one embodiment, logical conditions are boolean in nature, that is, either true or false depending on the nature of the condition and the values referenced by it. A condition may be (but is not limited to) one of the following:

An aspect or property of a form field, which has a boolean value. For example, a field which is a check box is either checked or not checked.

The stage or signature state of the electronic document. (For example, the electronic document instance is either at the third signature or it is not).

A relationship between the contents of the field and a fixed or variable value. (For example, the numeric value of the contents of a field is either greater than 5 or not. Or, the character value of the contents of a field is either "Sales" or is not. Or, the average numeric value of the contents of a list of fields is either greater than the minimum value of the contents of another list of fields or it is not).

In one embodiment, logical conditions are defined interactively by the electronic document author by selecting fields, field properties and logical operators from the graphical user interface of the process builder. Field selection is from a list prepared from the contents of the electronic document, making it impossible for the electronic document author to specify a field not present on the electronic document.

In one embodiment, properties and logical operators are provided as interactive selections, and only those elements of the condition which will lead to a well-formed logical condition are enabled for selection by the electronic document author.

In one embodiment, logical relations are presented to the electronic document author in phrases in the language of the electronic document author, rather than as programming constructs. Thus, the electronic document author can select from constructs such as "less than" or "greater or equal to" instead of the programming elements "<" and ">=".

FIG. 4 illustrates a table showing a sample mapping of logical phrases 410 to different programming language code representations. In FIG. 4, logical phrases as listed by the process builder 410 are shown. In the second column, the corresponding JavaScript code 420 is shown. In the third column, the corresponding C code 430 is shown. In the fourth column, the corresponding Pascal code 440 is shown. Accordingly, the electronic document author need have no knowledge of the equivalent programming construct for a condition in order to construct the condition.

In one embodiment, the transformation of the logical condition into its corresponding programming code may be accomplished, for example, by a look-up table which maps each possible selection on the graphical user interface into a corresponding code phrase in some programming language.

Figure 5A:
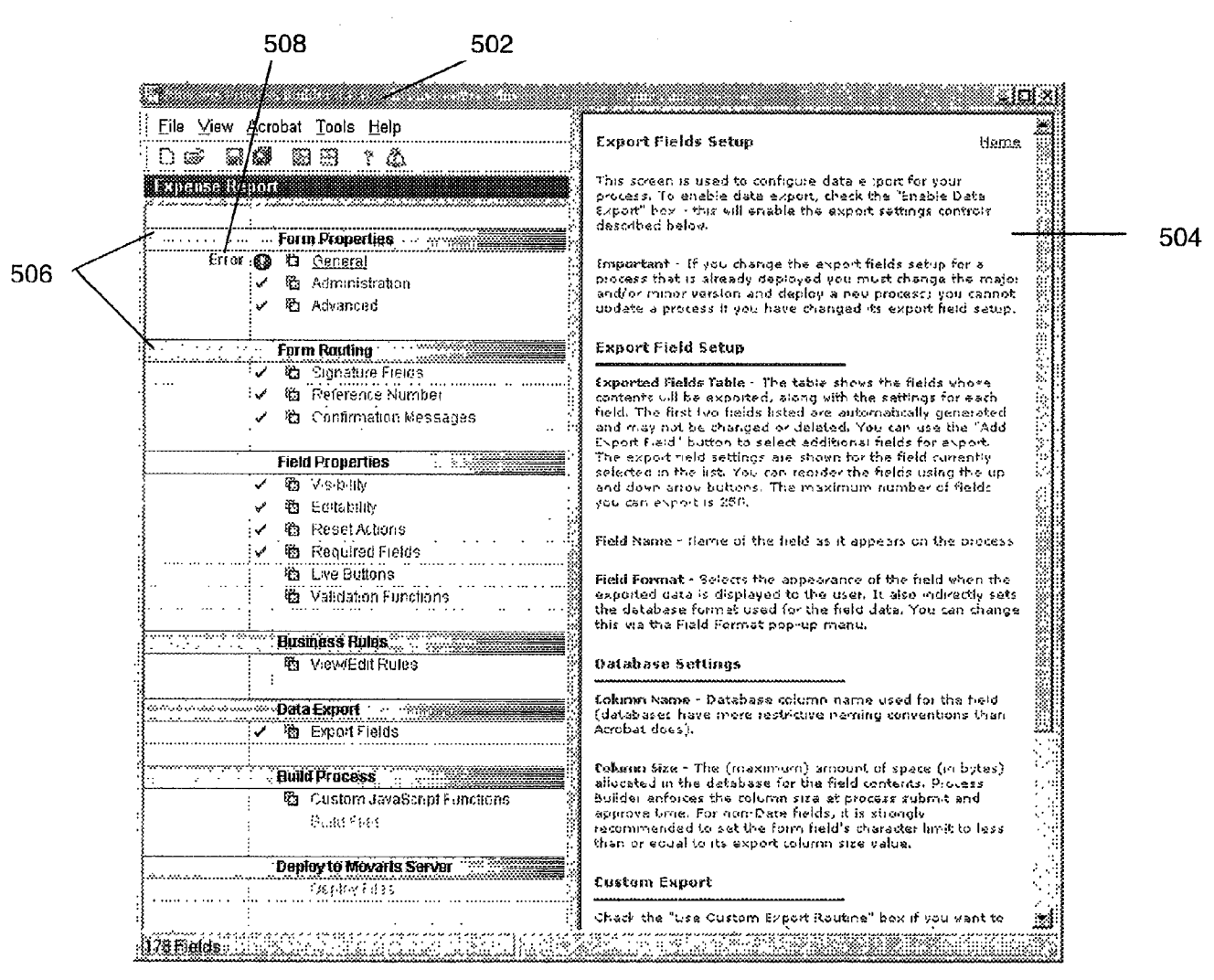

FIG. 5a illustrates one embodiment of a graphical user interface (GUI) window with a process creation checklist main menu screen 502. In one embodiment, the process builder may use such a checklist menu 502 to allow the electronic document author to easily create a process for routing the electronic document. The process creation checklist menu screen 502 allows the author to choose different headers 506 such as "form properties" and "business rules" to create a system of routable electronic documents.

In one embodiment, a separate screen 504 parallels the checklist menu 502 giving instructions on how to use the checklist menu 502. In one embodiment, an error message 508 informs the electronic document author that an error has occurred with respect to that particular sub-category within a particular header 508. For instance, referring to FIG. 5a, the electronic document author may not have entered enough data or information into the "general" subcategory under the header, "form properties." Accordingly, the error message 508 ensures that the process builder receives enough information from the author to create a process for routing one or more of the electronic documents.

Figure 5B:
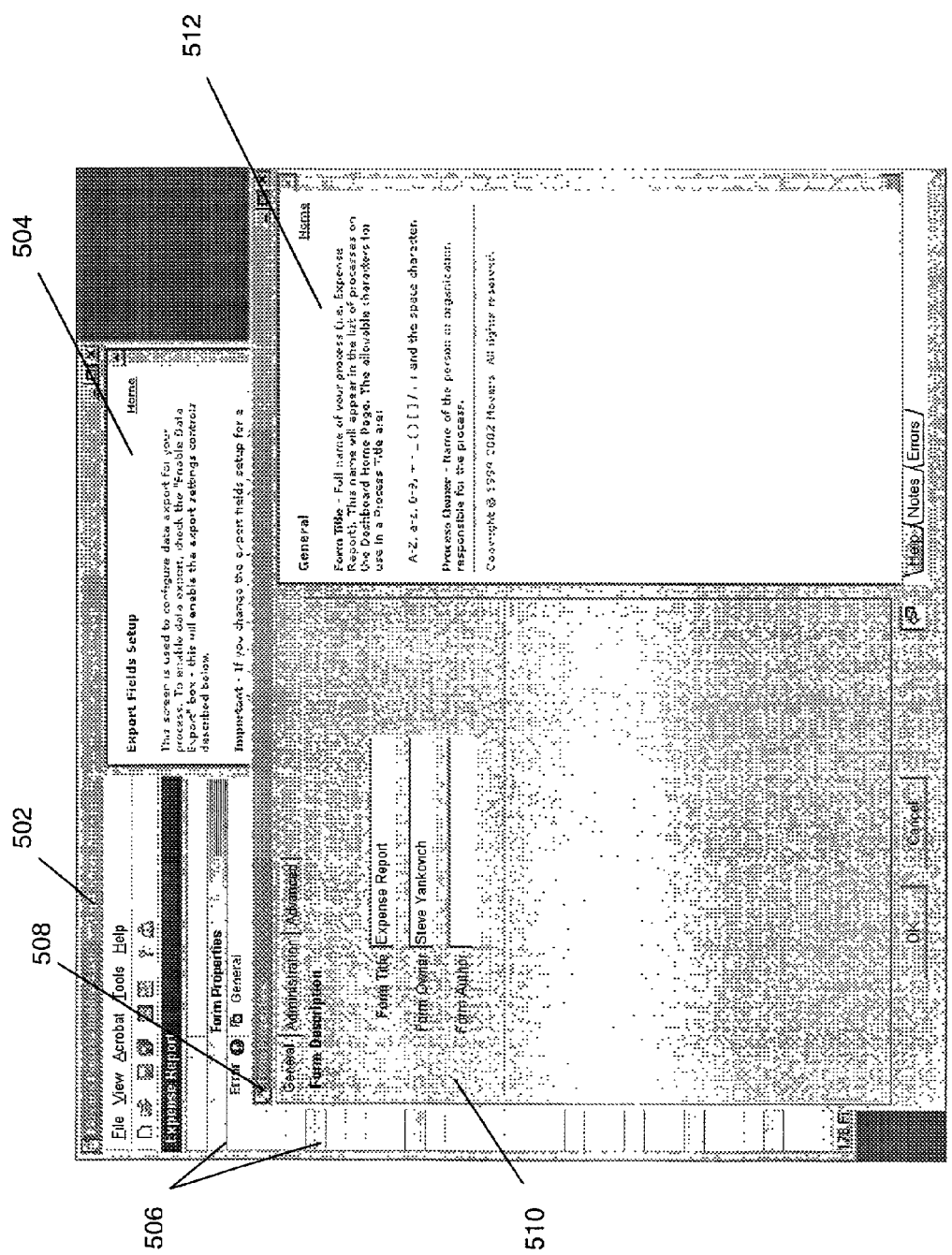
FIG. 5b illustrates one embodiment of a GUI window with a form properties screen.

FIG. 5b illustrates one embodiment of a GUI window with a form properties screen 510. The form properties screen 510 allows the electronic document author to input general information about the electronic document. In FIG. 5b, the electronic document author has clicked on the header 506, "form properties" in the checklist menu 502 to arrive at the screen 510. At the screen 510, the electronic document author may input general information about the electronic document such as the title (e.g. Expense Report).

Figure 5C:
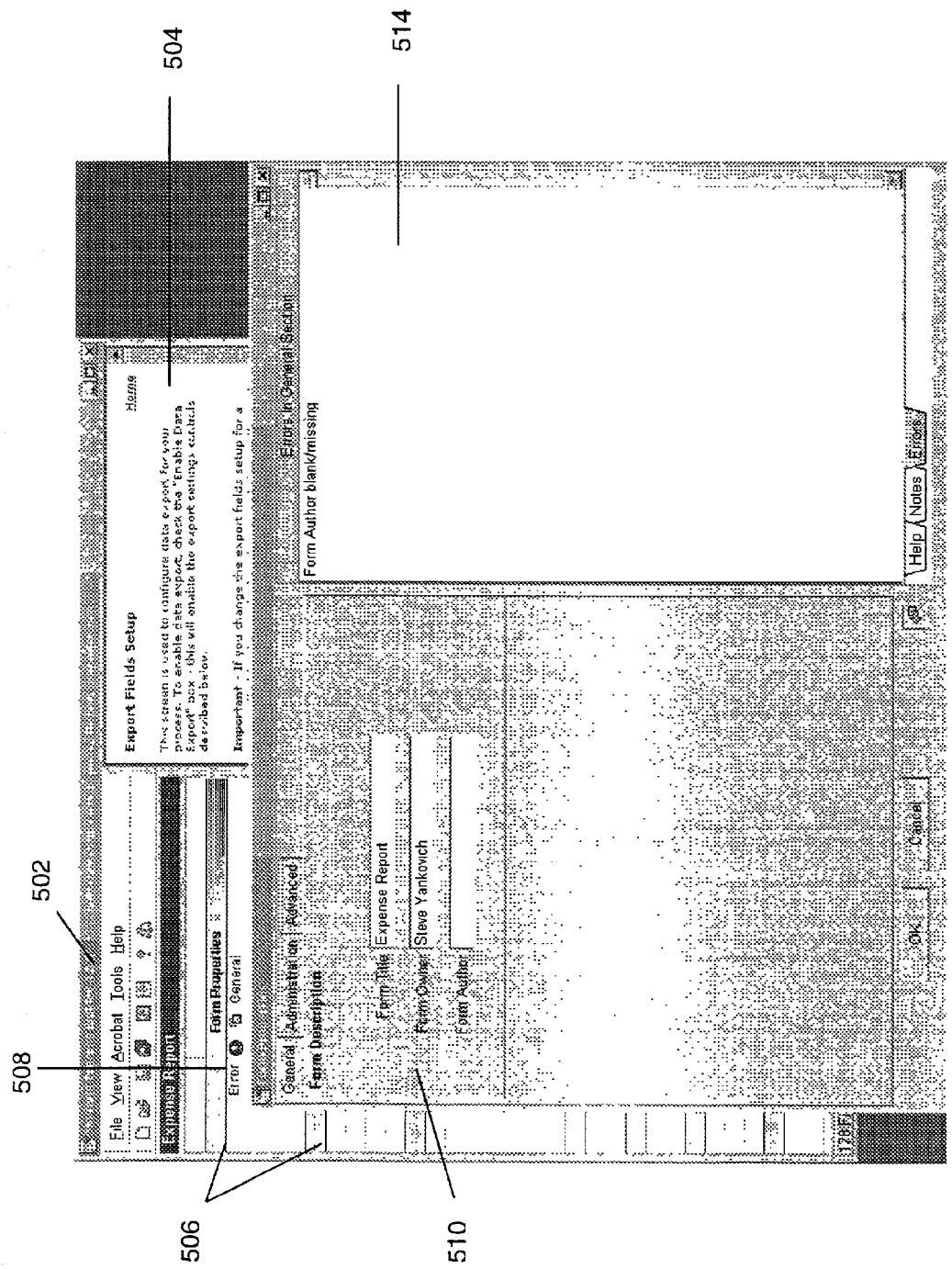
FIG. 5c illustrates one embodiment of a GUI window with a help screen associated with the form properties screen of FIG. 5b.

In one embodiment, a parallel help screen 512 explains how to use the screen 510 and what type of information should be entered on the screen 510 by the electronic document author. In an alternative embodiment, an error message screen 514 is displayed on the GUI if there is an error with inputting the information in one or more screens from the checklist menu 502. For example, FIG. 5c illustrates one embodiment of a GUI window with a help screen 514 associated with the form properties screen 510 of FIG. 5b. The help screen 514 in FIG. 5c tells the electronic document author that information the form author needs to be entered in the form description screen 510.

Figure 5D:
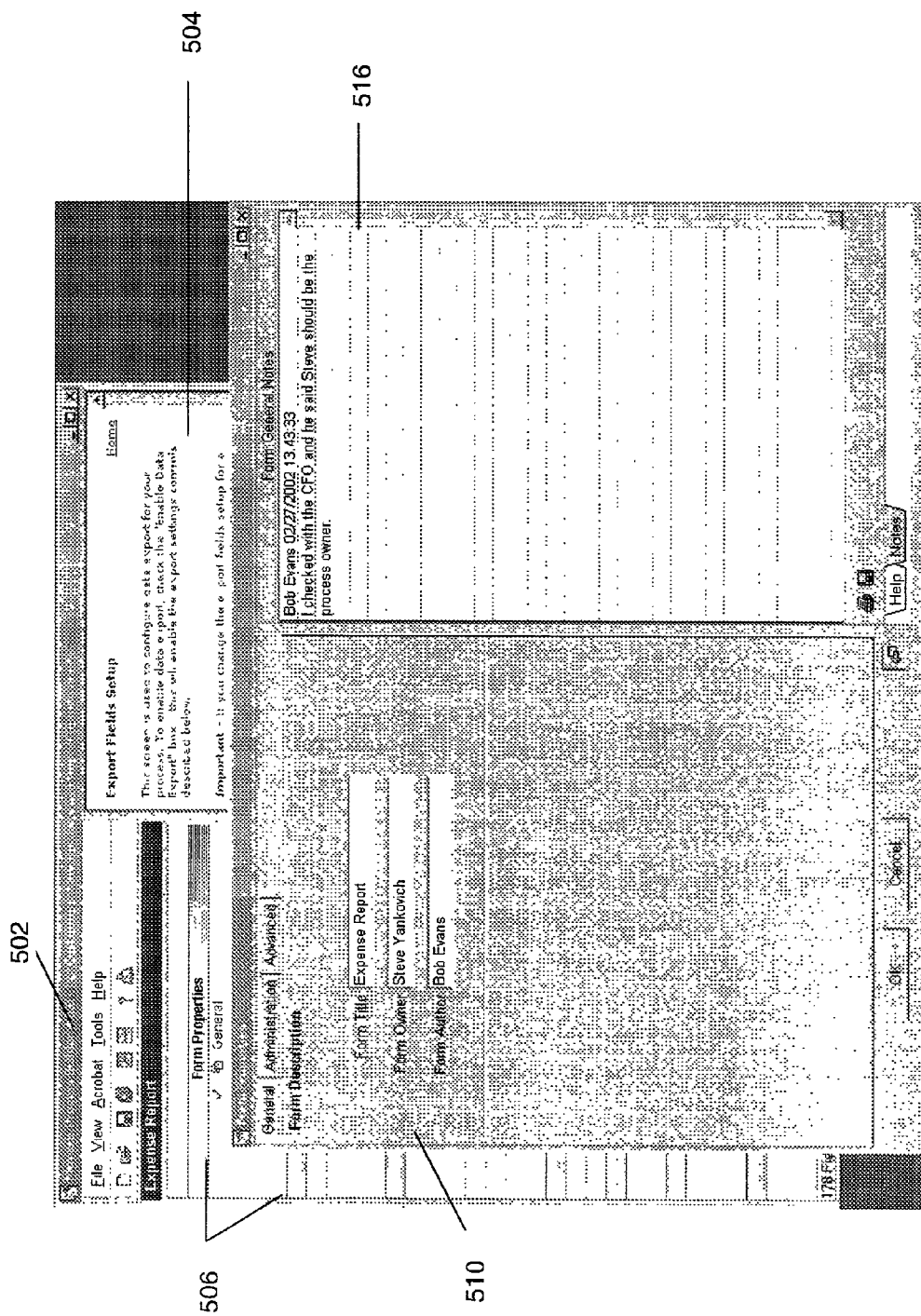
FIG. 5d illustrates one embodiment of a GUI window with a notes screen for the form properties screen of FIG. 5b.

In one embodiment, a parallel notes screen allows the electronic document author to document any notes or comments about a particular screen. FIG. 5d illustrates one embodiment of a GUI window with a notes screen 516 for the form properties screen 510 of FIG. 5b. In FIG. 5d, the electronic document author has entered the form author information to so that the error message 508 of FIGS. 5a, 5b, and 5c is removed. In addition, the electronic document author has entered comments regarding the Form Properties screen 510 on the parallel notes screen 516.

Figure 5E:
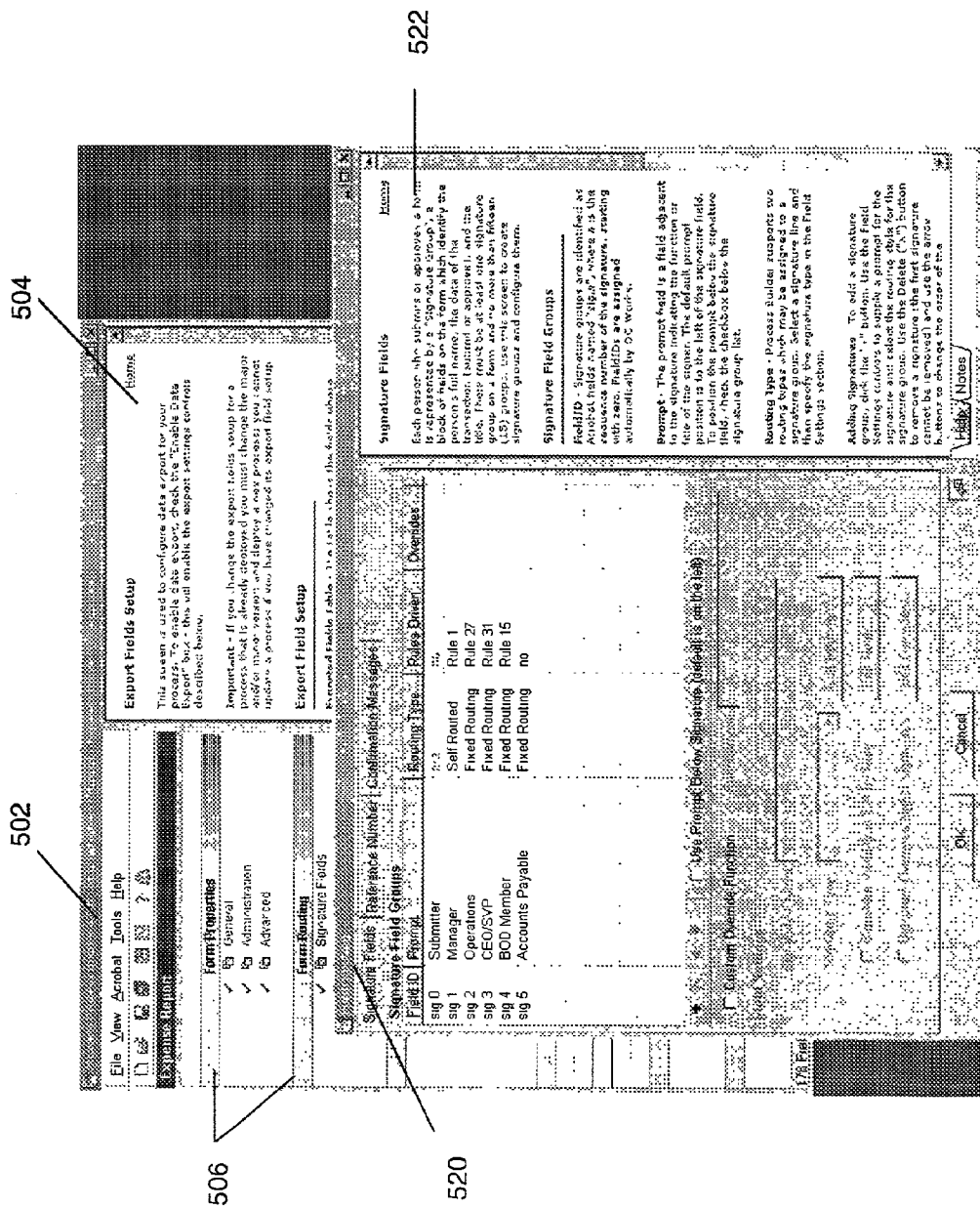
FIG. 5e illustrates one embodiment of a GUI window with a signature screen.

FIG. 5e illustrates one embodiment of a GUI window with a signature screen 520. The signature screen 520 allows the electronic document author to input the names of various electronic document users that will submit or approve the electronic document. A parallel help screen 522 provides instructions on how to use the signature screen 520 and what to input into the signature screen 520.

Figure 5F:
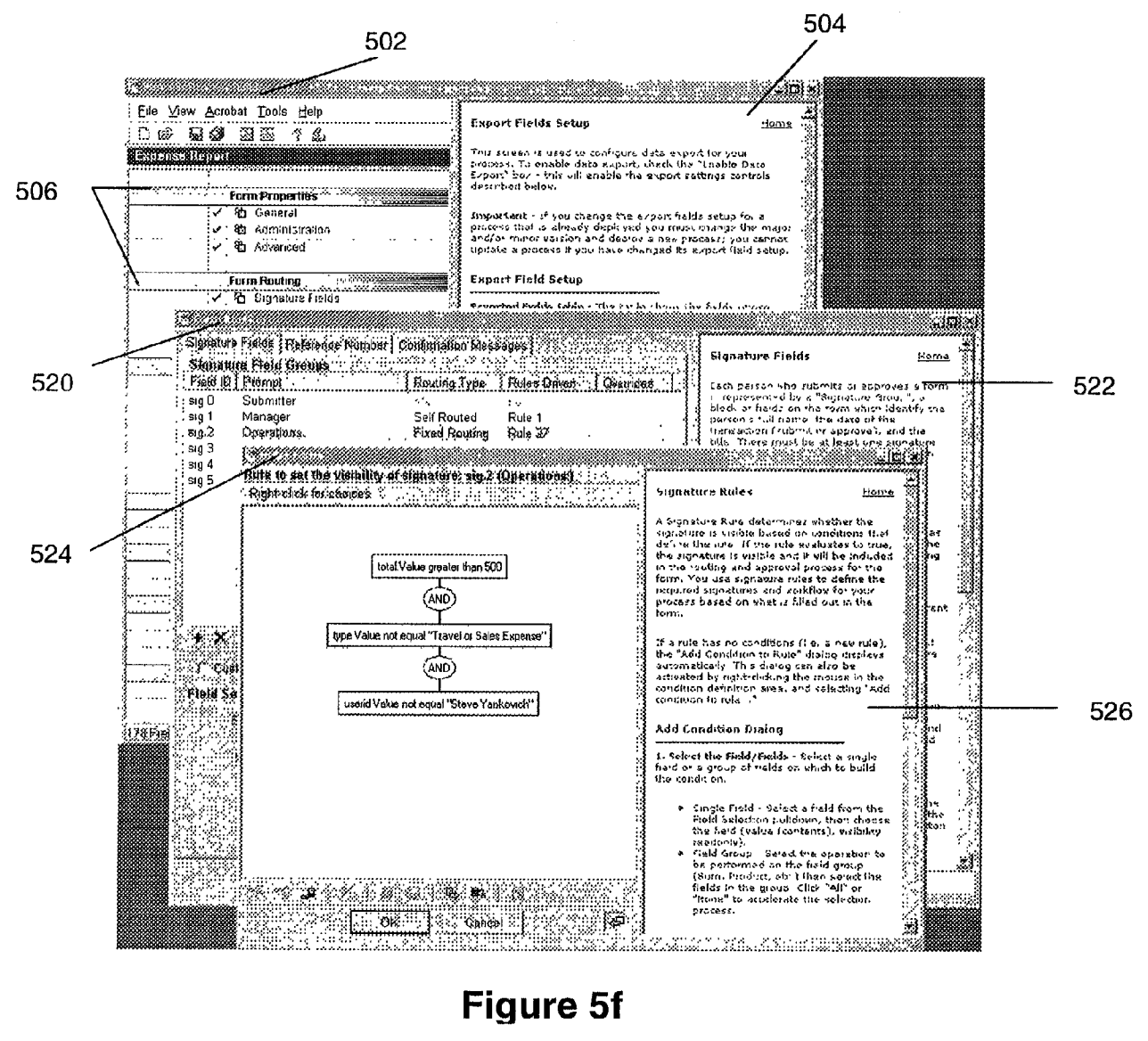

FIG. 5f illustrates one embodiment of a GUI window with a rules editor screen 524 for an "operations" signature field in FIG. 5e. The rules editor screen 524 allows the electronic document author to create one or more rules for routing the electronic document based on the signature of a user from "Operations". A parallel help screen 526 provides instructions on how to use the rules editor screen 524 and what to input into the rules editor screen 524.

Figure 6:
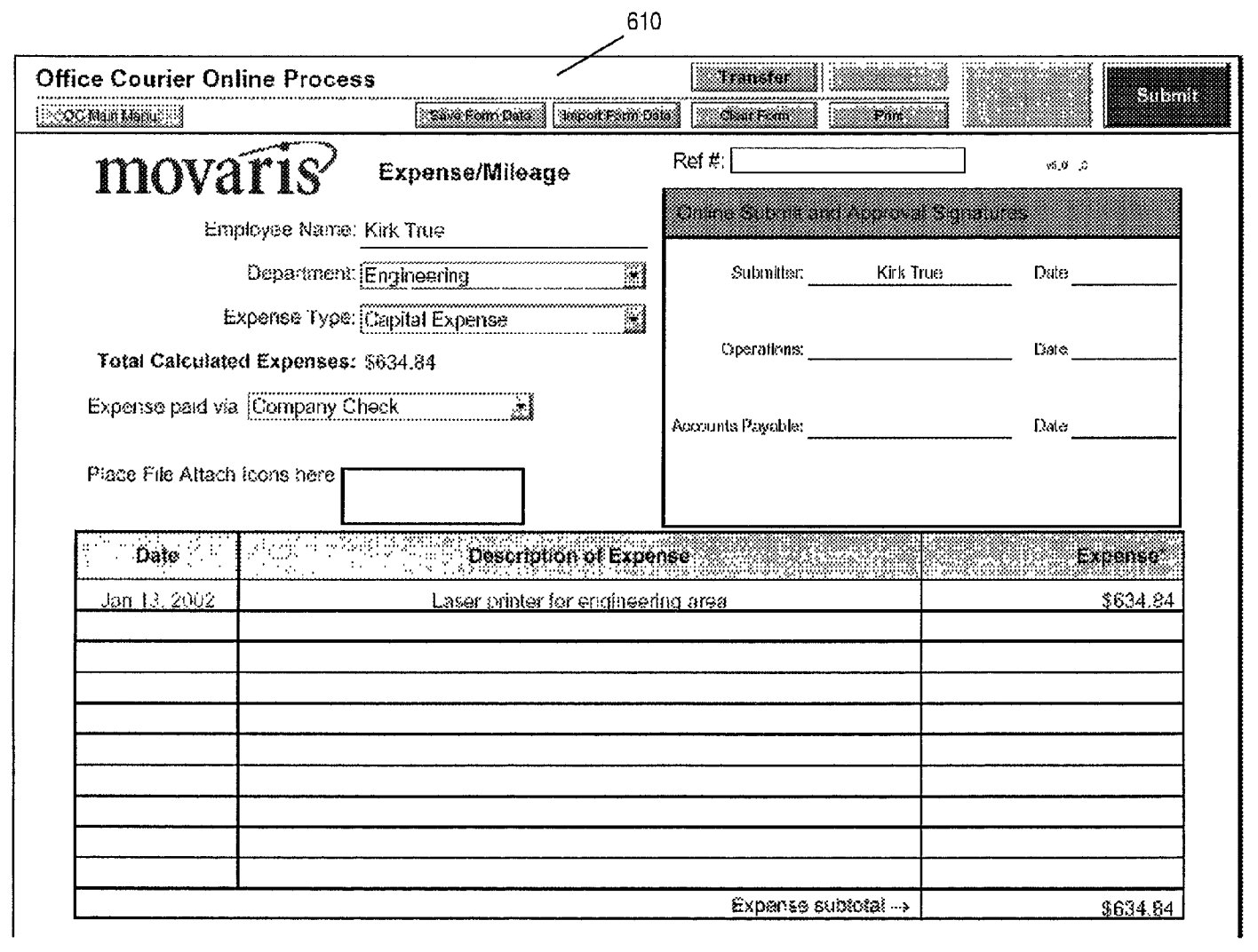

FIG. 6 illustrates one embodiment of an electronic document 610 embodying the rule created from rules editor screen 524 of FIG. 5f. For example, the electronic document 610 is routed to Operations (which is a fixed routing to the user Steve Y) if the rule is satisfied. The rule is satisfied if the amount of expense entered by the user is less than $500, is not a sales or travel expense, and the employee is not Steve Y.

Figure 5G:
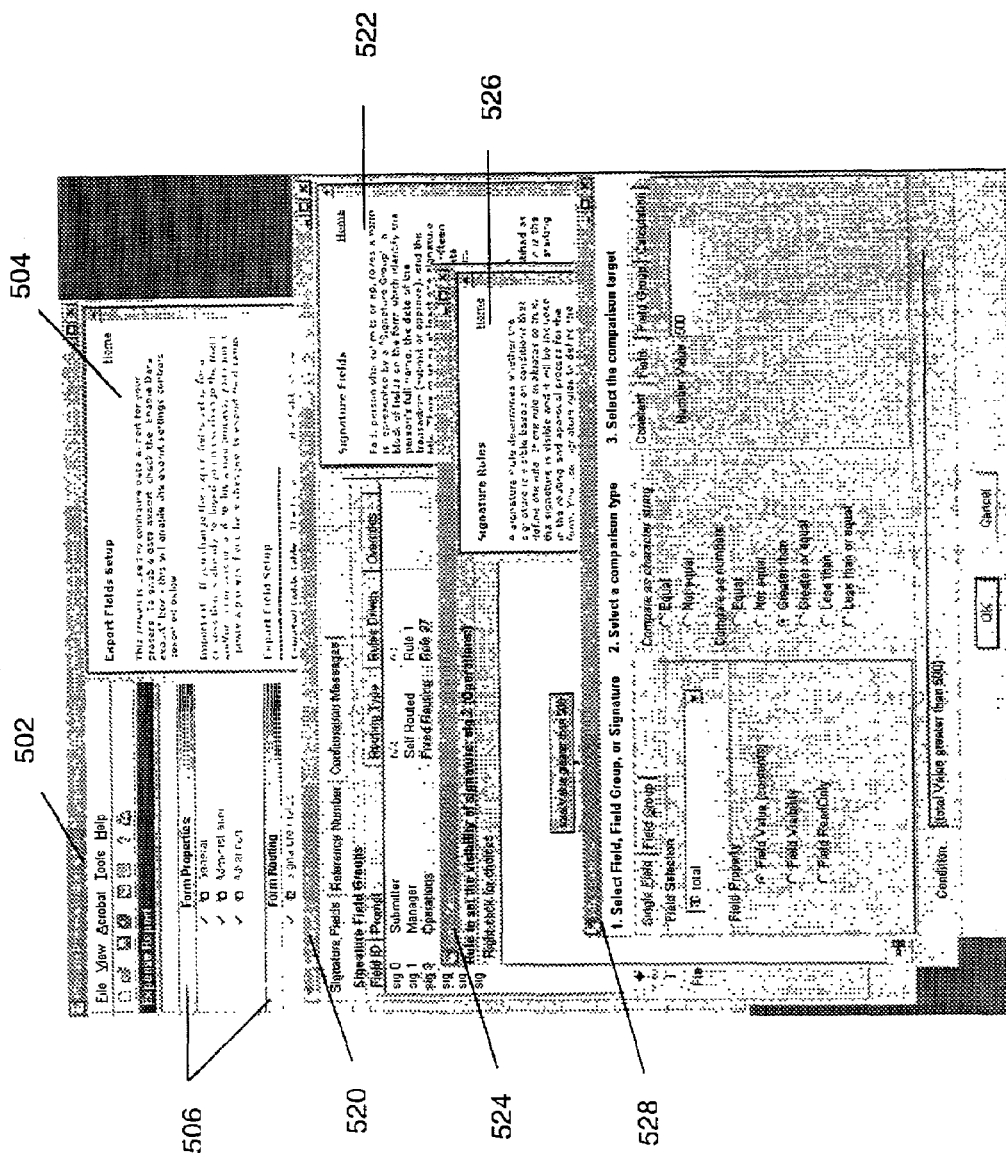
FIG. 5g illustrates one embodiment of a GUI window with an edit condition screen for the rules editor screen of FIG. 5f.

FIG. 5g illustrates one embodiment of a GUI window with an edit condition screen 528 for the rules editor screen 524 of FIG. 5f. On the edit condition screen 528, the electronic document author can edit a condition. In one embodiment, edit condition screen 528 includes a selection component for selecting a field, field group, or signature. Another selection component allows the electronic document author to select a comparison type. A third selection component allows the electronic document author to select a comparison target.

In one example, as discussed above with reference to FIG. 5h, a simple business rule for a single electronic document may be that "The electronic document requires Operation's signature if the amount exceeds $500". This rule is implemented by placing a field to hold Operation's signature on the electronic document, and causing the electronic document to display that signature field whenever the value contained in the "total" field is greater than 500.

Referring to FIG. 5g, the electronic document author would construct that rule by pointing and clicking on various selection components on the edit condition screen 528. First, the electronic document author would pick "Single Field" and select "Total" as a "Field Value" for the Operation's signature field. Then, the electronic document author would move into the selection component and choose "Greater than". Finally, the electronic document author would move into the selection component and enter the amount "500". Accordingly, this creates a condition for the visibility of the field containing Operation's signature.

Figure 5H:
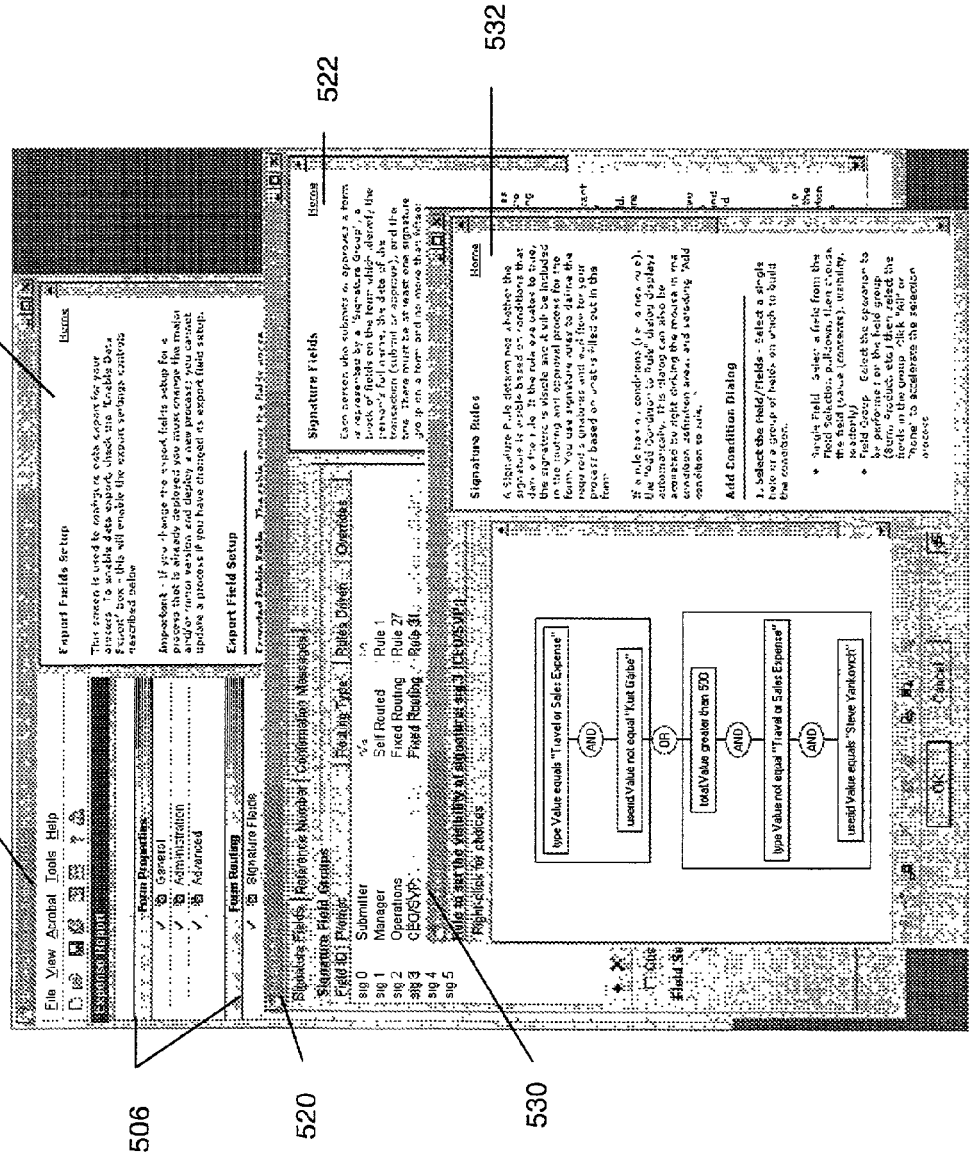
FIG. 5h illustrates one embodiment of a GUI window with a different rules editor screen.

FIG. 5h illustrates one embodiment of a GUI window with a different rules editor screen 530. In the rules editor screen 530 of FIG. 5h, a more complex rule with grouping (via box outline) and boolean connection of conditions is shown. In one embodiment, conditions are shown in "natural language" format, enclosed in a visual box. A parallel help screen 532 for the rules editor screen 530 is also shown.

Using a graphical pointing device, the electronic document author can indicate groupings of conditions and alter the order of conditions and groups within the rule. The electronic document author is prevented from creating rule constructs, which are internally inconsistent or which have circular dependencies on the field contents used in the rule conditions.

Rules may be used for a variety of purposes in the implementation of an electronic document, including but not limited to:

To control the visibility of a signature field on the electronic document. (This has the effect of altering the routing of the electronic document, as the electronic document is routed to the target represented by the next visible signature on the electronic document).

To control the visibility of other fields on the electronic document, causing additional contents of the electronic document to be presented to the electronic document author or suppressing unneeded data input fields.

To control the editability of a field or fields on the electronic document, so as to prevent the subsequent alteration of field contents during electronic document routing.

To cause a field to become (nor not become) a required field. (Required fields must be completed before the electronic document can be submitted or proceed to the next step in electronic document routing).

To select from multiple, fixed routing targets when a routing step requires routing to one of a number of pre-defined targets.

Rules are then translated from the graphical representation to corresponding programming code and inserted into the electronic document so as to cause the rule(s) to be evaluated each time a change is made to the electronic document by the electronic document user. The result of rule evaluation may cause the appearance of the electronic document to change (hide/unhide fields) or change the editability of fields on the electronic document, or even alter the routing destinations for the electronic document.

Referring back to FIG. 5b, the code generated for the embodiment shown in FIG. 5h is as follows:

OCShowSig(3,OCRule31);
(OCCond4 && OCCond14)||(OCCond3 && OCCond2 && OCCond15)
OCCond4=(this.getField("type").value =="Travel or Sales Expense");
OCCond14=(this.getField("userid").value !="Kurt Garbe");
OCCond3=(this.getField("total").value>500);
OCCond2=(this.getField("type").value !="Travel or Sales Expense");
OCCond15=(this.getField("userid").value "Steve Yankovich");

This code is situated within the electronic document so as to be executed whenever the field values on the electronic document are evaluated as a result of entries into the electronic document.

Figure 5I:
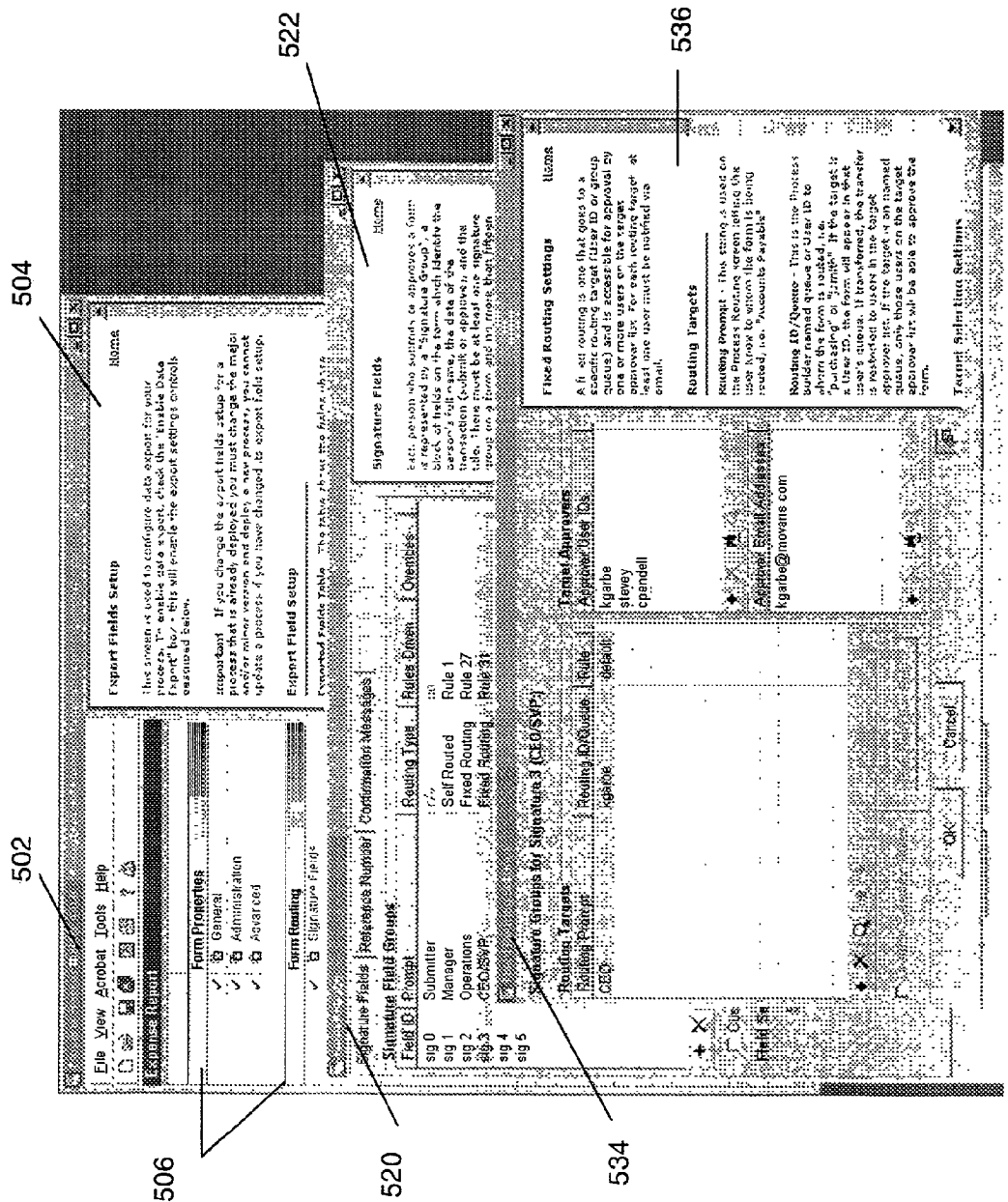
FIG. 5i illustrates one embodiment of a GUI window with a fixed routing settings screen.

FIG. 5i illustrates one embodiment of a GUI window with a fixed routing settings screen 534. The fixed routings settings screen 534 allows the electronic document author to create a fixed routing based on the approval signatures of one or more users. For example, in FIG. 5i, a fixed routing of the electronic document is based on several signatures. One signature is that of the CEO (kgarbe). In FIG. 5i, a parallel help screen 536 is also shown.

Figure 5J:
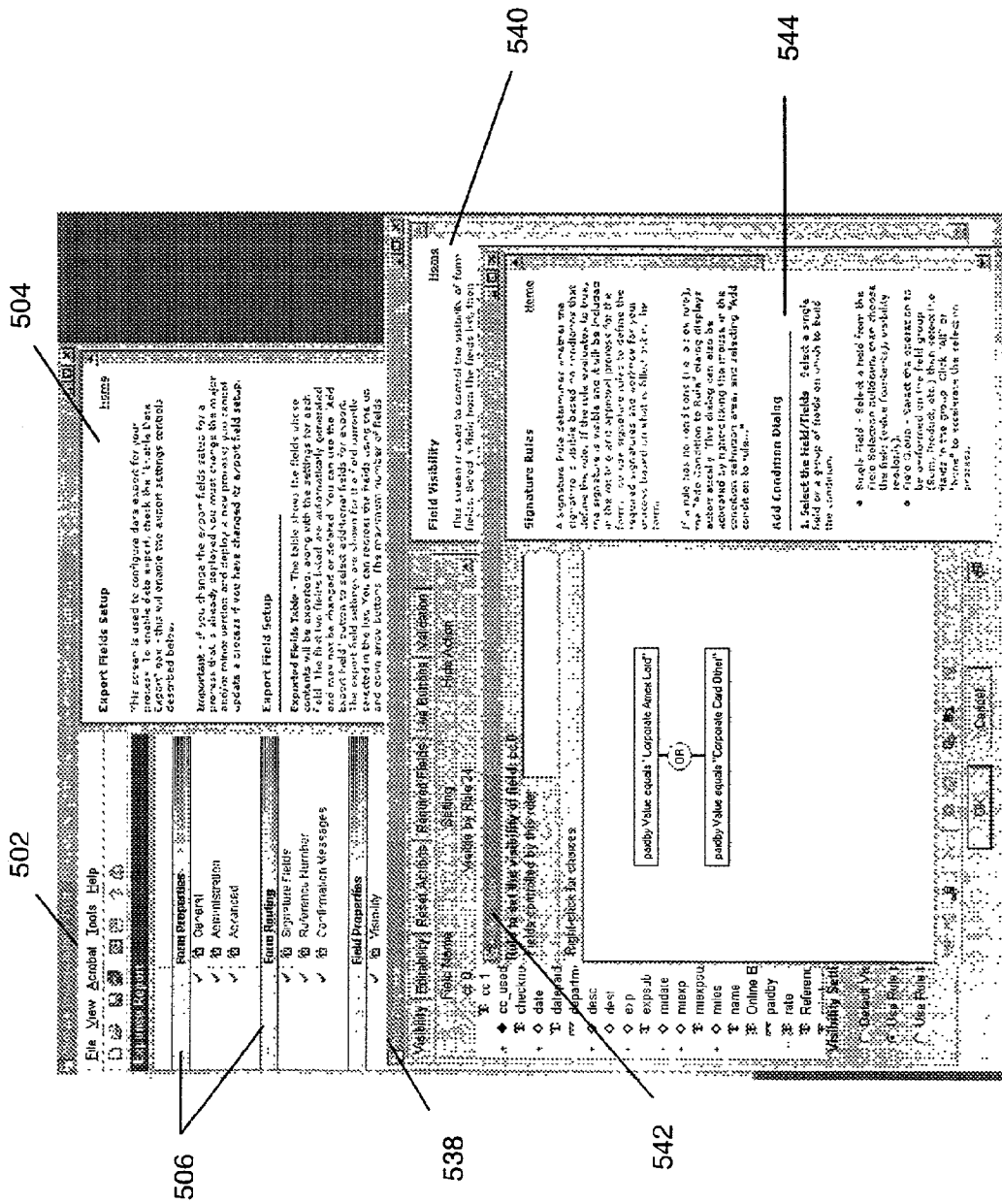
FIG. 5j illustrates one embodiment of a GUI window with a rules editor screen showing a rule to set the visibility of field "cc.0"

Similarly, the creation of rules and conditions can control the visibility of a form field based on data/values entered into other form fields by the electronic document user. FIG. 5j illustrates one embodiment of a GUI window with a rules editor screen 542 showing a rule to set the visibility of field "cc.0". The rules editor screen 542 is pulled up after the electronic document author clicks on a field properties screen 538 and picks one or more fields. Parallel help screens 540 and 544 are also shown.

Figure 5K:
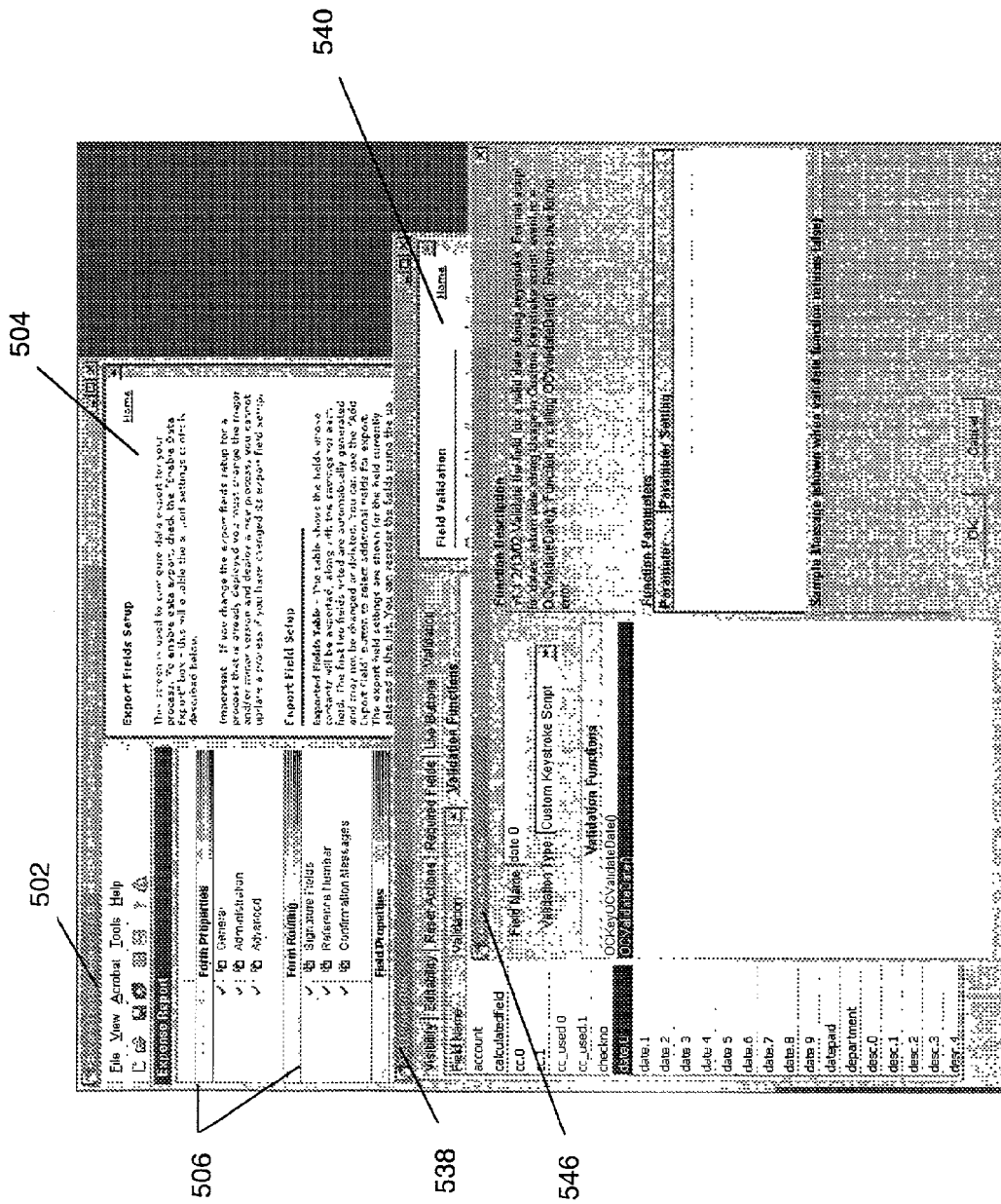
FIG. 5k illustrates one embodiment of a GUI window with a validation screen.
Figure 5I:
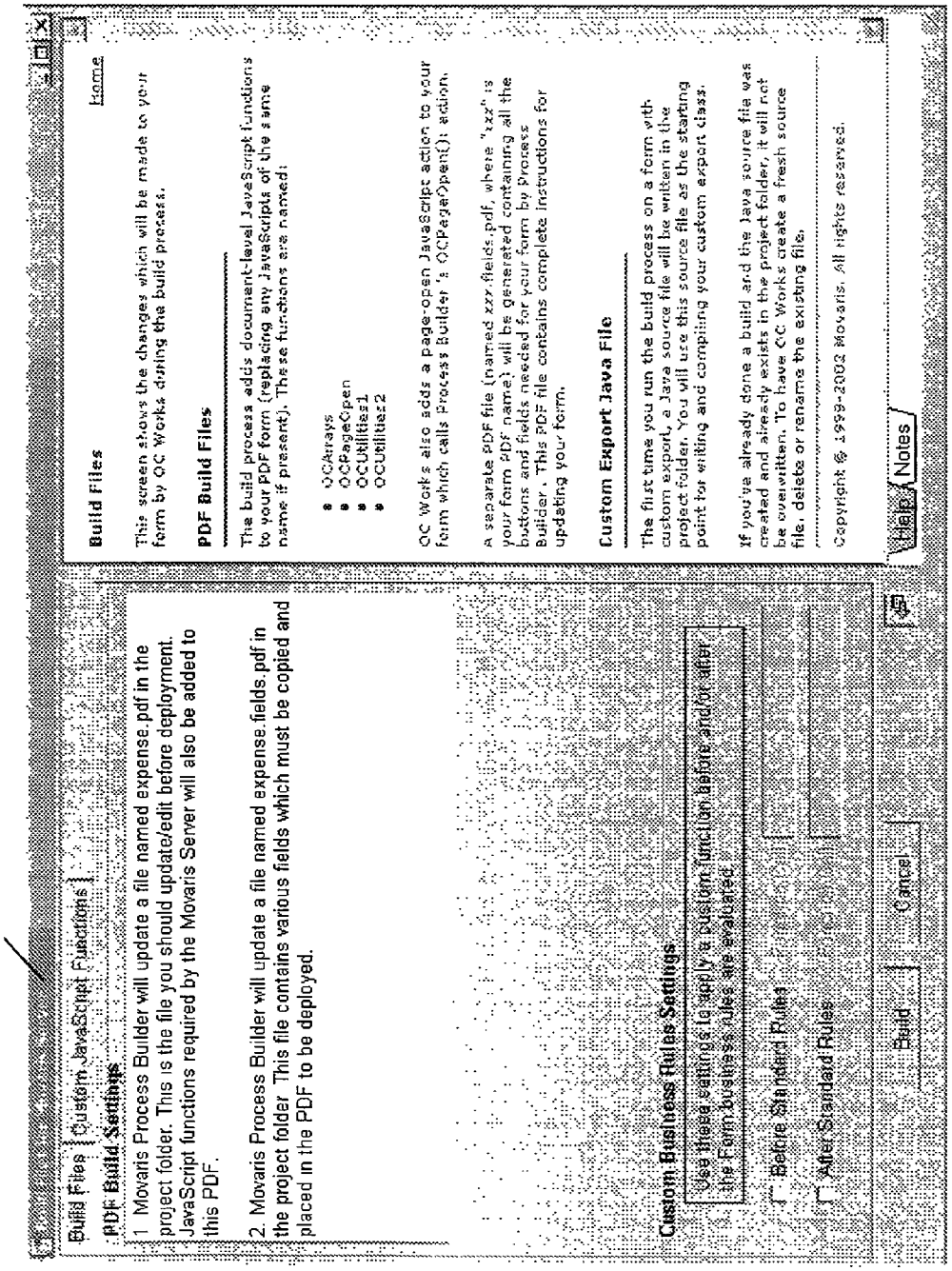

FIG. 5k illustrates one embodiment of a GUI window with a validation screen 546. In one embodiment, the validation screen 546 allows the electronic document author to assign validation to a field. The author can select a field and then select a validation script to be assigned to that field. For example, the validation script may be that the chosen form field must be formatted as a date or a six digit number. So the user cannot enter alphabet letters in the form field on the electronic document labeled as "date".

In one embodiment, additional validation may occur by using a directory service product. For example, in order to confirm correct information is being input into the process builder by the electronic document author, this information may be automatically or manually checked via the directory service product. For example, a directory services product using the lightweight directory access protocol (LDAP) can confirm user names input by the electronic document author.

FIG. 5l illustrates one embodiment of a GUI window with a build screen 548. The build screen 548 takes all the information input from the checklist menu 502 and turns it into one or more electronic documents with inserted code and properties for the server upon the electronic document creator's request.

In one embodiment, the process builder may include a database of already created conditions and rules. The electronics document author may be allowed access to this database to look up already created rules and conditions by natural language keywords. Accordingly, new electronics documents may be created by the author without having to recreate rules and conditions.

In one embodiment, the process builder may combine one process of routing one or more electronic documents with one or more processes of routing other electronic documents. For example, a first process ("Process A) may be built to route a particular electronic document ("original document"). The process builder may be used to spawn several other electronic documents based on the original document. In addition, the process builder may be used to control the routing and validation of the other electronic documents.

For example, Process A validates and routes the original document. Process builder allows an electronic document author to crates conditions and rules such that if these conditions and rules become true, other new processes (Process B and Process C) are spawned. In one embodiment, this may mean new electronic documents are created and routed to various users. In an alternative embodiment, this may mean that duplicate copies of the original document are sent to various users. Each duplicate copy would be a part of a separate process, (Processes B and C).

In one embodiment, the duplicate copy of the original document may already have specific form fields automatically filled out before it is sent to the next user according to Process B or C. In one embodiment, these duplicate electronic documents may rendezvous after completion of all the required form fields in the electronic document by one or more users. Rendezvous may involve the duplicate copies of the original document being sent back to the first user or a certain end user.

As an example, the original document may be a new employee form. This new employee form must be filled out by the new employee. Process A validates and routes the new employee form to Human Resources based on form field completion by the new employee. Based on the employee's entries and the form fields, new processes B and C are created. Process B routes a duplicate copy of the new employee form to Accounting so that the Accounting department may take care of the new employee's paychecks. Process B adds new form fields in the duplicate copy to allow Accounting to enter information. Process C routes a different duplicate copy of the new employee form to Office Services so that Office Services can provide necessary supplies to the new employee. Process C may also add new form fields to allow Office Services to enter information.

In this example, Process A spawned processes B and C. In the same example, once Accounting has completed valid entry of the required form fields and Office Services has done the same, these duplicate copies may rendezvous with the original new employee form at Human Resources.

In one embodiment, the process builder is used in a system of routable electronic documents. Depending on the nature of the business process, the electronic document instance will subsequently be viewed by one or more persons, "approvers" (electronic document users). The sequence of approvers, called the routing of the electronic document is determined by several factors including, but not limited to:

1. The electronic document author providing a sequential set of fields, called "signature fields", representing all possible viewers/approvers of the electronic document, together with business rules for determining which signature fields (and hence, which approvers) will become active as a result of information entered into fields on the electronic document.

2. The response of approvers to the electronic document instance who may choose to continue the routing of the electronic document to the next active approver or return the electronic document to any earlier approver (including the submitter of the electronic document).

The route taken by an instance of a electronic document may change dynamically from approver (user) to (user) approver based on the evaluation of the contents of the electronic document by the embedded business rules. For example, the passage of time since the electronic document instance was first submitted may be a factor in a business rule, causing the activation and/or deactivation of signature fields on the electronic document, resulting in a dynamic change to the routing flow of the electronic document instance.

Figure 8:
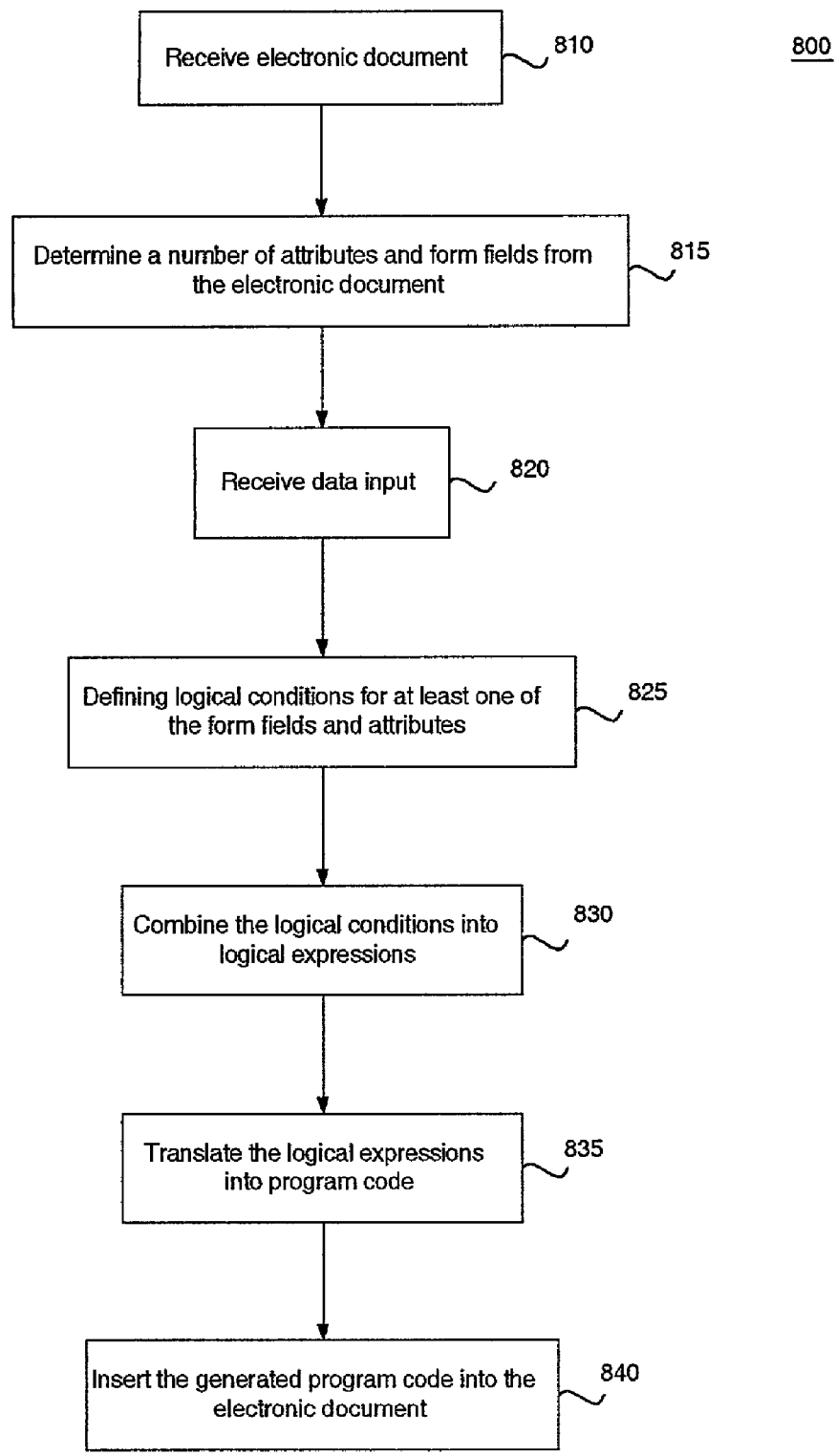
FIG. 8 illustrates a flow diagram of one embodiment of a process of building a system for routable electronic documents.

FIG. 8 illustrates a flow diagram of one embodiment of a process 800 of building a system for routable electronic documents. At processing block 810, an electronic document having programmable features is received at the process builder. At processing block 815, the process builder determines a number of attributes and form fields from the electronic document. At processing block 820, the process builder receives data input from an electronic document author using a graphical user interface. At processing block 825, the process builder defines logical conditions for at least one of the form fields and attributes based on the received data input. At processing block 830, the process builder combining the logical conditions into logical expressions. At processing block 835, the process builder translating the logical expressions into program code. At processing block 840, the process builder inserts the generated program code into the electronic document.

It will be appreciated that more or fewer processes may be incorporated into the method(s) illustrated in FIG. 8 without departing from the scope of the invention and that no particular order is implied by the arrangement of blocks shown and described herein. It further will be appreciated that the method(s) described in conjunction with FIG. 8 may be embodied in machine-executable instructions, e.g. software. The instructions can be used to cause a general-purpose or special-purpose processor that is programmed with the instructions to perform the operations described. Alternatively, the operations might be performed by specific hardware components that contain hardwired logic for performing the operations, or by any combination of programmed computer components and custom hardware components. The methods may be provided as a computer program product that may include a machine-readable medium having stored thereon instructions which may be used to program a computer (or other electronic devices) to perform the methods. For the purposes of this specification, the terms "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result.

Figure 9:
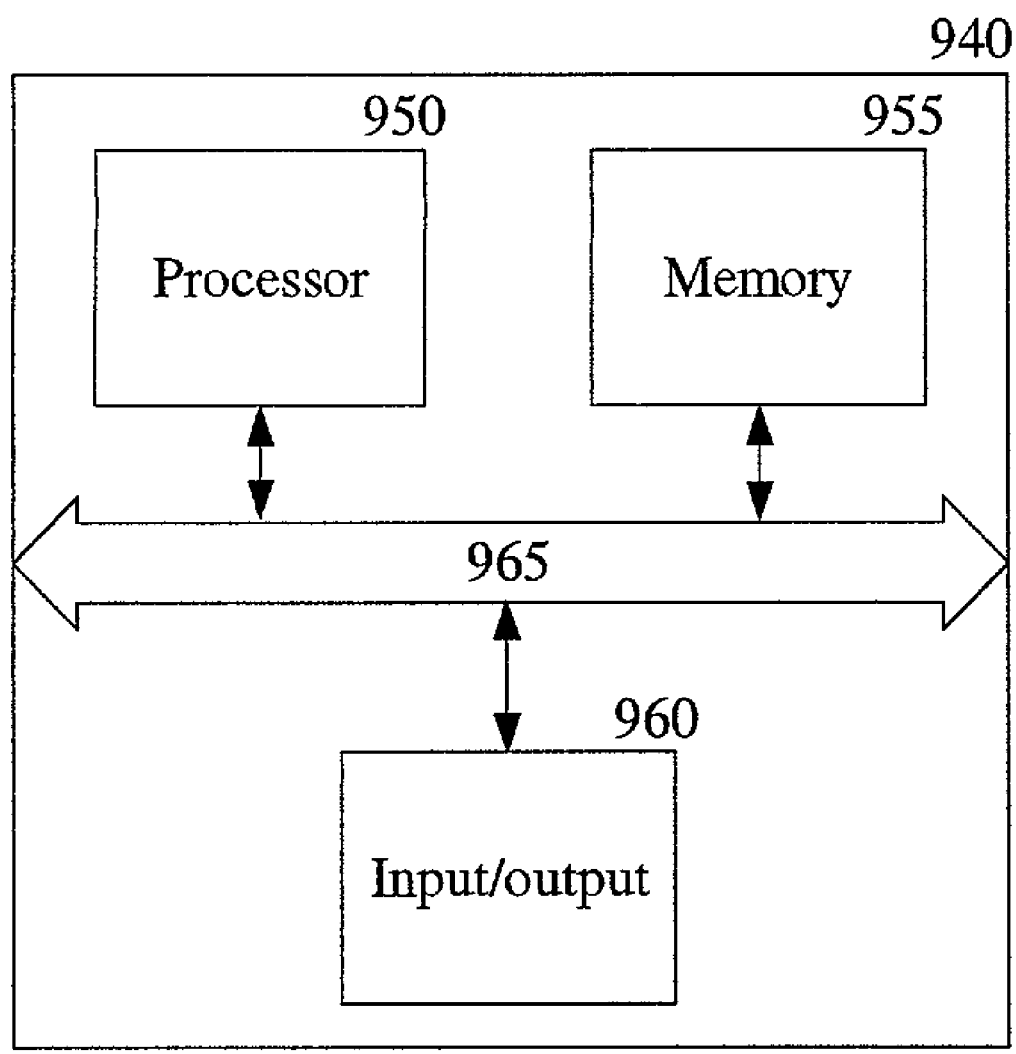
FIG. 9 illustrates a block diagram of one embodiment of a computer system.

One embodiment of a computer system suitable for the process builder is illustrated in FIG. 9. The computer system 940, includes a processor 950, memory 955 and input/output capability 960 coupled to a system bus 965. The memory 955 is configured to store instructions which, when executed by the processor 950, perform the methods described herein. The memory 955 may also store the input and currently edited video content. Input/output 960 provides for the delivery and display of the video content or portions or representations thereof. Input/output 960 also encompasses various types of computer-readable media, including any type of storage device that is accessible by the processor 950. One of skill in the art will immediately recognize that the term "computer-readable medium/media" further encompasses a carrier wave that encodes a data signal. It will also be appreciated that a server is controlled by operating system software executing in memory 955. Input/output and related media 960 store the computer-executable instructions for the operating system and methods of the present invention as well as the video content.

The description of FIG. 9 is intended to provide an overview of computer hardware and other operating components suitable for implementing the invention, but is not intended to limit the applicable environments. It will be appreciated that the computer system 940 is one example of many possible computer systems which have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

A process builder for a routable electronic document system and method for using the same have been described. Although the present invention has been described with reference to specific embodiments, the specification and drawings are to be regarded as illustrative rather than restrictive.

The invention claimed is:

1. In a computer system comprising multiple distributed enduser workstations, a method for controlling the routing of electronic documents, said method residing in a computer readable medium comprising the computer implemented steps of:

receiving an electronic document;
   wherein receiving an electronic document comprises:
      receiving a scanned version of a paper document; and
      creating an electronic document from the scanned version;
   building a reverse cone of logic from each possible routing approval signature for an electronic document to every input that would affect it;
   toggling between boolean-AND and boolean-OR functions graphically represented by a label to join every datum field or groups of data fields;
   selecting data fields;
   connecting the data fields with the boolean functions:
   adding as many data elements as necessary;
   grouping data elements by drawing a bounding box to represent the function of parentheses;
   creating programmatic elements equivalent to the boolean group;

inserting the programmatic elements into the electronic document;

determining if a routing approval signature for a role or level of approval is required or not required for each possible routing approval signature given the values of the data fields;

setting the visibility of each signature form field if it is determined to be required; and routing the electronic document to a required approving enduser for signature signifying approval.

2. A computer implemented electronic document comprising computer readable files stored on a computer readable medium authored using the method of claim 1 wherein said electronic document is in a format selected from the group consisting of portable document format (PDF), Microsoft Word, hypertext markup language (HTML), XML/XSLT, Xforms, XHTML, WML, and extended markup language (XML) format; and further wherein said programmatic element is selected from the group consisting of Pascal, Java, JavaScript, C, and Visual Basic for Applications (VBA) programming languages.

3. In a computer system, a method for controlling the routing of electronic documents, said method residing in a computer readable medium comprising the computer implemented steps of:

creating an electronic document;

building a reverse cone of logic from each possible process for an electronic document to every input that would affect it; wherein a process comprises one or more methods selected from the following group:

affixing a routing approval signature,
changing a graphical display,
controlling visibility of a field,
controlling editability of a field,
initiating another process,
triggering an event,
requiring data entry,
prompting an interactive response,
enabling the attachment of another document,
querying a database, and
routing the document to a certain user, and wherein building comprises:
selecting data fields;
connecting the data fields with one or more boolean functions;
creating programmatic elements equivalent to the boolean group; and
inserting the programmatic elements into the electronic document;

determining if the process is required or not required given the values of the data fields;

and routing the electronic document to the process if required.

* * * * *